United States Patent

Yang et al.

[11] Patent Number: 5,976,222
[45] Date of Patent: Nov. 2, 1999

[54] RECOVERY OF PERFLUORINATED COMPOUNDS FROM THE EXHAUST OF SEMICONDUCTOR FABS USING MEMBRANE AND ADSORPTION IN SERIES

[75] Inventors: James Hsu-Kuang Yang, Allentown, Pa.; Iosif Chernyakov, Fort Lee, N.J.; Thomas Hsiao-Ling Hsiung, Emmaus; Alexander Schwarz, Bethlehem, both of Pa.

[73] Assignee: Air Products and Chemicals, Inc., Allentown, Pa.

[21] Appl. No.: 09/046,092

[22] Filed: Mar. 23, 1998

[51] Int. Cl.⁶ .......................... B01D 53/22; B01D 53/047
[52] U.S. Cl. .......................... 95/45; 95/47; 95/51; 95/96; 95/131; 95/142; 95/149; 95/234; 95/235
[58] Field of Search ..................................... 95/45, 47–49, 95/51–55, 96, 131, 135, 114, 142, 149, 235, 236

[56] References Cited

U.S. PATENT DOCUMENTS

| | | | |
|---|---|---|---|
| Re. 33,678 | 9/1991 | Campbell et al. | 95/52 X |
| 4,119,417 | 10/1978 | Heki et al. | 55/158 |
| 4,180,388 | 12/1979 | Graham et al. | 55/16 |
| 4,435,191 | 3/1984 | Graham | 95/51 |
| 4,597,777 | 7/1986 | Graham | 95/51 |
| 4,599,096 | 7/1986 | Burr | 95/51 |
| 4,654,063 | 3/1987 | Auvil et al. | 62/18 |
| 4,701,187 | 10/1987 | Choe et al. | 55/16 |
| 4,717,407 | 1/1988 | Choe et al. | 95/53 X |
| 4,781,907 | 11/1988 | McNeill | 95/51 X |
| 4,787,919 | 11/1988 | Campbell et al. | 95/52 X |
| 4,894,068 | 1/1990 | Rice | 55/16 |
| 4,964,886 | 10/1990 | Brugerolle et al. | 95/51 |
| 5,051,114 | 9/1991 | Nemser et al. | 95/51 X |
| 5,064,446 | 11/1991 | Kusuki et al. | 95/53 |

(List continued on next page.)

FOREIGN PATENT DOCUMENTS

0754487A1  1/1997  European Pat. Off. .

OTHER PUBLICATIONS

Glenn M. Tom, et al., "PFC Concentration and Recycle" Mat. Res. Soc. Symp. Proc. vol. 344, 1994 pp. 267–271.
Denis Ruffin presentation at semiconductor PFC workshop in Austin Texas, Feb. 7, 1996.
Air Products and Chemicals, Inc. and Radian International L.L.C., PFC Recovery Systems for the Electronics Industry, 1996, Publication No. 325–95410.
Rautenbach, et al., Gas Permeation–Module Design and Arrangement, Chem. Eng. Process, 21 (1987) pp. 141–150.
"PFC Capture Alpha Systems Testing Update", Ruffin, et al., *PFC Technical Update* SEMI 1996.
"PFC Capture Alpha Systems Testing Update", Cummins, et al., SEMI 1996.

Primary Examiner—Robert Spitzer
Attorney, Agent, or Firm—Geoffrey L. Chase

[57] ABSTRACT

A process for the separation and recovery of fluorochemicals from a gas stream containing a diluent gas and fluorochemicals by contact of the gas stream with a membrane system in combination with an adsorption system, the adsorption system used either before or after the membrane system. In either case the membrane portion of the combined system comprises the steps of: compressing a gas stream containing a diluent gas and fluorochemicals to an elevated pressure; heating the gas stream containing a diluent gas and fluorochemicals to an elevated temperature sufficient to increase the flux of the permeate stream and to increase the selectivity of the membrane for the permeation of the diluent gas relative to the permeation of the fluorochemicals; contacting the gas stream with a membrane which is selectively more permeable to the diluent gas than the fluorochemicals to result in a permeate stream rich in the diluent gas and a retentate rich in fluorochemicals; contacting the gas stream with one or more additional membranes which are selectively more permeable to the diluent gas than the fluorochemicals to result in a second permeate stream rich in the diluent gas and a second retentate rich in fluorochemicals; and recycling the second permeate stream to be compressed with the gas stream containing diluent gas and fluorochemicals to an elevated pressure.

20 Claims, 4 Drawing Sheets

U.S. PATENT DOCUMENTS

| | | | |
|---|---|---|---|
| 5,116,396 | 5/1992 | Prasad et al. | 95/51 X |
| 5,240,471 | 8/1993 | Barbe et al. | 95/54 |
| 5,240,472 | 8/1993 | Sircar | 95/52 |
| 5,252,219 | 10/1993 | Xu | 210/640 |
| 5,282,969 | 2/1994 | Xu | 210/640 |
| 5,332,424 | 7/1994 | Rao et al. | 95/47 |
| 5,378,263 | 1/1995 | Prasad | 95/54 |
| 5,417,742 | 5/1995 | Tamhankar et al. | 95/96 |
| 5,455,016 | 10/1995 | Choe et al. | 423/359 |
| 5,482,539 | 1/1996 | Callahan | 95/51 |
| 5,502,969 | 4/1996 | Jin et al. | 62/11 |
| 5,538,536 | 7/1996 | Fuentes et al. | 95/47 X |
| 5,709,732 | 1/1998 | Prasad | 95/45 |
| 5,730,779 | 3/1998 | Chernyakov et al. | 95/47 X |
| 5,759,237 | 6/1998 | Li et al. | 95/45 X |
| 5,814,127 | 9/1998 | Li | 95/47 |
| 5,827,351 | 10/1998 | Prasad et al. | 95/45 |
| 5,843,208 | 12/1998 | Anumakonda et al. | 95/45 X |
| 5,855,647 | 1/1999 | Li et al. | 95/47 X |
| 5,858,065 | 1/1999 | Li et al. | 95/47 X |
| 5,858,066 | 1/1999 | O'Brien et al. | 95/45 X |

RECOVERY OF PERFLUORINATED COMPOUNDS FROM THE EXHAUST OF SEMICONDUCTOR FABS USING MEMBRANE AND ADSORPTION IN SERIES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The semiconductor industry uses fluorinated gases, such as carbon tetrafluoride and hexafluoroethane, as etchants and cleaning gases in semiconductor manufacturing processes. These gases do not fully react within the reaction chamber. The unused (unreacted) gases enter the atmosphere through the process effluent from such reactors and have long persistence in the atmosphere. These gases absorb infrared radiation and are, therefore, potential global warming gases. The industry has sought ways to diminish the amount of fluorinated gases reaching the atmosphere and ways to recycle such gases particularly in light of their low utilization on a single pass basis for their intended etching and cleaning purposes.

Fluorochemicals, such as perfluorinated hydrocarbons and perfluorinated chemicals, are used in the semiconductor industry as safe and noncorrosive sources of fluorine. In plasma environments, fluorochemicals, such as fluorinated gases, form fluorine species which are capable of etching wafers or cleaning insides of reactor chambers. The gaseous products of the etching or cleaning process are exhausted from the reactor chamber to the scrubber or vent systems of the semiconductor fabrication plant with potential for venting to atmosphere. Consumption of fluorinated gases in the reactor chamber is not complete. Experiments have shown that in some cases less than 10% of hexafluoroethane is used.

Abatement of fluorochemicals currently follows several techniques. One method currently used by the semiconductor industry for insuring that fluorochemicals are not released to the environment involves combustion of the fluorochemicals contained in an effluent stream. While this method effectively destroys the fluorochemicals, thus preventing environmental pollution, it also makes it impossible to reuse the fluorochemicals. This method is also disadvantageous because it generates waste gases, such as hydrogen fluoride and nitrogen oxides, which require further treatment. Furthermore, combustion processes require fuel and oxygen to operate, adding additional operating and capital cost to the semiconductor and manufacturing operation.

Alternatively, these fluorochemicals can be recovered for reuse. Several schemes have been published in the literature to capture these chemicals.

Glenn M. Tom, et al. in the article "PFC Concentration and Recycle", Mat. Res. Soc. Symp. Proc. Vol. 344, 1994, pp 267–272 describes a process for concentrating perfluorinated gases using carbon-containing adsorptive beds. This process requires considerable energy demands based upon pressurization and depressurization to maintain a continuous process in switching adsorptive beds.

U.S. Pat. No. 5,502,969 discloses a process using a mass transfer contact zone with a wash liquid and one or more stages of cryogenic distillation to recover fluorine compounds from a carrier gas such as those constituting an effluent stream from a semiconductor facility. Both cryogenics and adsorption comprise energy-intensive and capital-intensive separatory processes.

Dennis Rufin in a presentation at a semiconductor PFC workshop in Austin, Tex., Feb. 7, 1996, presented a process for recycling perfluorochemicals from a process tool exhaust. The process involves compression, wet and dry scrubbing, additional compression, filtration, a concentration step followed by condensation and packaging for recycle after off site purification, certification and additional repackaging. The perfluorocarbon concentration unit disclosed in the process sequence was not identified. Rufin made a similar presentation at Semicon West, PFC CAPTURE ALPHA SYSTEMS TESTING UPDATE, 1996, pp 49–54.

U.S. Pat. No. 4,119,417 discloses a process wherein a feed gas stream is passed over two cascade connected semi-permeable membranes with the permeate stream from the second membrane being recycled to the feed gas prior to the first membrane. The process is typified by a separation of nitrogen from krypton. Other gases which can be separated from various binary mixtures include hydrogen, helium, nitrogen, oxygen, air, neon, argon, krypton, xenon, radon, fluorine, chlorine, bromine, uranium hexafluoride, ozone, hydrocarbons, sulfur dioxide, vinyl chloride, acrylonitrile and nitrogen oxides. The membranes utilized for these separations include silicon rubber, polybutadiene rubber, polyethylene, tetramethyl pentane resin, cellulose acetate, ethyl cellulose, Nuclear Pore, a material produced by General Electric, tetrafluoroethylene, polyester and porous metal membranes.

U.S. Pat. No. 4,654,063 discloses a process for conducting hydrogen purification using a semi-permeable membrane along with a non-membrane type separation wherein the retentate from the membrane can be further processed in a cryogenic or adsorptive separation system.

U.S. Pat. No. 4,701,187 discloses the use of cascade membranes wherein the retentate from a first membrane is conducted to a second membrane and the retentate from the second membrane is conducted to a down stream further adsorptive separation for product recovery. The permeate from the second membrane is recycled to the feed of the first membrane.

Air Products and Chemicals, Inc. and Radian International L.L.C. publicized a process titled PFC Recovery Systems for the Electronics Industry, 1996, Publication No. 325-95410 depicting a process wherein a mixture of vacuum pump diluent and fluorinated gases from a process tool of a semiconductor fabrication facility passes through a guard bed and a wet scrubber followed by gas compression, drying and adsorption with recycle of a portion of the purified diluent from the absorbers to before the gas compression, while the more concentrated fluorinated gases pass through further gas compression, condensation and distillation to recover a product, such as 99.9+% hexafluoroethane. The process can be designed to recover hexafluoroethane, carbon tetrafluoride, trifluoromethane, nitrogen trifluoride and sulfur hexafluoride.

Rautenbach, et al., Gas Permeation-Module Design and Arrangement, Chem. Eng. Process, 21, 1987, pp. 141–150 discloses various membrane arrangements for gas separation.

A European Patent Application published as EP 0 754 487 A1 discloses a process for recovery of perfluorinated compounds from a gas mixture using a combination of membranes and distillation to recover the perfluorinated components. The permeate stream from the membrane unit(s) is recycled as feed to the membrane unit. There is no disclosure relating to using the permeate stream as a vacuum pump diluent or as part of the feed to a compressor up stream of either a membrane/adsorption or adsorption/membrane process to recover and reuse the perfluorinated compounds and an enriched diluent stream.

Additional patents of interest include U.S. Pat. Nos. 4,180,388, 4,894,068, 5,240,471 and 5,252,219.

The prior art, although addressing the problem of capture and recycle of fluorochemicals used in the semiconductor industry, such as perfluorinated compounds and more specifically perfluorocarbons, has failed to provide a low capital cost, low energy-intensive process for the capture and concentration of the desired fluorinated compounds as is achieved by the present invention, which will be set forth in greater detail below.

BRIEF SUMMARY OF THE INVENTION

The present invention, in one embodiment, is a process for the separation and recovery of fluorochemicals from a gas stream containing a diluent gas and fluorochemicals by contact of the gas stream with a membrane, comprising the steps of:

(a) compressing a gas stream containing a diluent gas and fluorochemicals to an elevated pressure;

(b) heating the gas stream containing a diluent gas and fluorochemicals to an elevated temperature sufficient to increase the flux of the permeate stream of step (c) and to increase the selectivity of the membrane of step (c) for the permeation of the diluent gas of step (c) relative to the permeation of the fluorochemicals of step (c);

(c) contacting the gas stream with a membrane which is selectively more permeable to the diluent gas than the fluorochemicals to result in a permeate stream rich in the diluent gas and a retentate rich in fluorochemicals;

(d) contacting the retentate with one or more additional membranes which are selectively more permeable to the diluent gas than the fluorochemicals to result in a second permeate stream rich in the diluent gas and a second retentate rich in fluorochemicals;

(e) recycling the second permeate stream to step (a) to be compressed with the gas stream containing diluent gas and fluorochemicals to an elevated pressure;

(f) passing the second retentate rich in fluorochemicals to an adsorption system wherein purified diluent is vented and a stream further enriched is fluorochemicals is adsorbed; and (g) desorbing said stream further enriched in fluorochemicals as a product stream.

Preferably, the gas stream containing a diluent gas and fluorochemicals is initially scrubbed to remove particulates, acid gases, and other water soluble components of the gas stream.

Preferably, after step (g) the product stream rich in fluorochemicals is further purified by distillation to provide a still further fluorochemical-rich product stream and a diluent-rich vent stream.

Preferably, the gas stream containing a diluent gas and fluorochemicals contains fluorochemicals selected from the group consisting of $NF_3$, $SF_6$, $CF_4$, $CHF_3$, $CH3F$, $C_2F_6$, $C_2HF_5$, $C_3F_8$, $C_4F_8$ and mixtures thereof.

Preferably, the gas stream containing a diluent gas and fluorochemicals is an effluent gas stream from a semiconductor fabrication process.

Preferably, the membranes are selected from the group consisting of polysulfone, polyetherimide, ethyl cellulose, and mixtures thereof.

Preferably, the fluorochemical-rich product stream comprises $C_2F_6$.

Preferably, the diluent gas is selected from the group consisting of nitrogen, helium, argon, air, and mixtures thereof.

Preferably, the fluorochemical rich product stream is recycled to the semiconductor fabrication process.

In a second embodiment the present invention is a process for the separation and recovery of fluorochemicals from a gas stream containing a diluent gas and fluorochemicals comprising the steps of:

(a) compressing said gas stream containing diluent gas and fluorochemicals to an elevated pressure;

(b) passing said gas stream containing diluent gas and fluorochemicals through an adsorption system to produce a vent stream rich in diluent gas and a fluorochemical enriched adsorbent;

(c) desorbing a fluorochemical enriched stream from said adsorption system;

(d) compressing said fluorochemical enriched stream;

(e) heating said compressed fluorochemical enriched stream to an elevated temperature sufficient to increase the flux of a permeate stream of step (e and to increase the selectivity of the membrane of step (f for the permeation of the diluent gas of step (f) relative to the permeation of the fluorochemicals of step (f);

(f) contacting the heated fluorochemical enriched gas stream with a membrane which is selectively more permeable to the diluent gas than the fluorochemicals to result in a permeate stream rich in the diluent gas and a retentate rich in fluorochemicals;

(g) contacting the retentate with one or more additional membranes which are selectively more permeable to the diluent gas than the fluorochemicals to result in a second permeate stream rich in the diluent gas and a second retentate rich in fluorochemicals; and (h) recycling the second permeate stream to step (a) to be compressed with the gas stream containing diluent gas and fluorochemicals to an elevated pressure.

Preferably in this embodiment the adsorption system is one of pressure-swing, vacuum-swing or temperature-swing utilizing one of carbon, polymeric, or zeolite adsorbents in one or more stages.

Preferably in this embodiment a portion of the vent stream from the adsorption system is used to desorb the adsorption system.

Preferably in this embodiment the gas stream containing a diluent gas and fluorochemical is initially scrubbed to remove particulates and water soluble components from the gas stream.

Preferably in this embodiment the second retentate is further purified by distillation to provide a still further fluorochemical enriched product stream and a diluent rich stream.

Preferably in this embodiment the gas stream containing a diluent gas and fluorochemicals is an effluent gas stream from a semiconductor fabrication process.

DETAILED DESCRIPTION OF THE INVENTION

Figure 1:
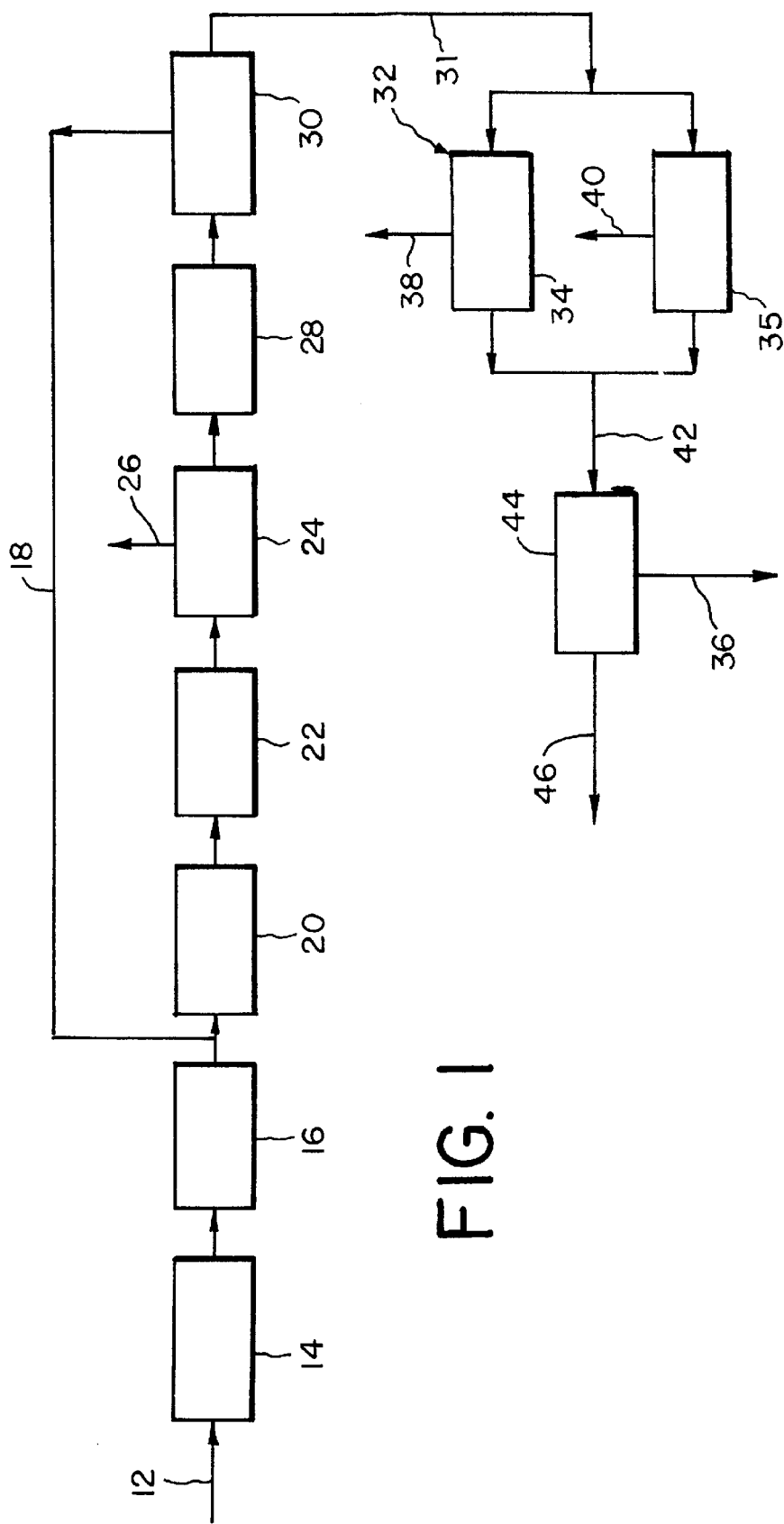
FIG. 1 is a schematic illustration of one embodiment of the present invention.

The present invention is a process to recover fluorochemicals, such as $NF_3$, $SF_6$, $CF_4$, $CHF_3$, $CH_3F$, $C_2F_6$, $C_2HF_5$, $C_3F_8$, $C_4F_8$ and mixtures thereof from the exhausts of semiconductor fabrication facilities. These types of gases are used for etching and cleaning operations in the fabrication of various electronic materials from electronic materials including the construction of integrated circuits. These gases typically have low utilization in any given process cycle; therefore, the effluent from the processes will contribute to the environmental concern of global warming. In addition, these gases have considerable value if they can be concentrated, purified and recycled for additional utilization.

The present invention achieves the capture, recovery and purification for potential recycle of the fluorochemicals described above, from the exhaust stream from a semiconductor fabrication facility which is typically rich in vacuum pump diluent, such as nitrogen or other inert gas by combining an adsorption system with a membrane system, the adsorption system used either before or after the membrane system. According to the present invention, the adsorption system can be of the well-known pressure-swing, vacuum-swing or temperature-swing type using carbon, polymeric, or zeolite adsorbents in one or more stages.

In the membrane system processes, the gas stream containing a diluent gas and fluorochemicals, is compressed and heated to elevate the temperature of the gas stream before being introduced into a membrane, which is more permeable to the diluent gas than the fluorochemicals in the gas stream, so as to separate the diluent gas from the fluorochemical gas components. This produces a permeate stream rich in vacuum pump diluent and a retentate which is rich in the fluorochemicals.

The retentate, comprising an enriched stream of fluorochemicals is sent to a second cascade membrane station while the permeate stream, rich in diluent gas is vented. In the second stage membrane, in cascade relationship to the first stage membrane, the fluorochemicals are again concentrated by the membrane, while the remaining diluent gas permeates selectively through the membrane as a permeate stream. The permeate stream is recycled to the compressor upstream of the first stage membrane to capture fluorochemicals, which in minor proportion may have copermeated through the membranes.

The second stage membrane, as well as the first stage membrane, is operated at elevated temperature to increase the flux of diluent gas through the membrane, while increasing the selectivity between the diluent gases and the fluorochemical gas components.

Depending upon the makeup of the feed gas stream containing diluent gas and fluorochemicals, additional stages of cascade connected membranes may be utilized, wherein the fluorochemical desired for recovery is rejected by the membrane and the diluent gas permeates through at a high rate of flux and with greater selectivity at elevated temperature for recycle to the first or initial stage of membrane separation for potential recovery of copermeating desired fluorochemicals.

The final retentate from the cascading multi-staged membrane separation, is the concentrated fluorochemicals that have not passed through the semi-permeable membrane, which can then be further processed for higher purification in a typical distillation or adsorptive separation prior to being used as a recycled product for reutilization by the semiconductor fabrication industry or particularly the particular process from which the fluorochemicals were taken as an effluent stream.

The membrane material may be comprised of polysulfone, polyetherimide, polypropylene, cellulose acetate, polymethylpentane, amorphous copolymers based on 2,2-bistrifluoromethyl4,5-difluoro-1,3-dioxole, polyvinyltrimethylsilane, polyimide, polyamide, polyaramide or ethyl cellulose polymer, all of which can be configured in hollow fiber, spiral wound or flat sheet geometries.

In the present invention, it has been unexpectedly ascertained that in conducting the membrane separation of fluorochemicals from diluent gases, such as nitrogen and helium, the operation of the membrane at elevated temperature has the surprising effect of not only increasing the flux rate or the permeance of the diluent gas through the membrane, but also increasing the selectivity between the diluent gas, such as nitrogen, and the fluorochemicals. Traditionally, elevated temperatures increase flux rates of the designed permeating stream, but at the risk of reducing selectivity, whereby the designed retentate specie also copermeates at an increased permeance or flux rate.

Increasing the temperature at which the membrane operates, such as by heating the feed gas stream to the membrane, when separating the gas mixtures typically found in semiconductor fabrication clean or etching effluents containing fluorochemicals, results in increased flux or permeance rates for the diluent gas, such as nitrogen, while also unexpectedly increasing the selectivity between the diluent gas and the retentate or fluorochemicals, such as the fluorochemicals and perfluorochemicals mentioned above. This unexpected finding provides enhanced operational performance of the present invention, whereby increased throughput can be provided at the cost of heat energy while providing even greater selectivity and, therefore, downstream purity of the fluorochemicals captured and isolated for recovery and potential reutilization.

Depending upon the amount of purity desired and where the adsorption system is incorporated, the two-stage cascade-connected membrane process portion of the present invention can be expanded to include a plurality of series cascade-connected membranes, wherein the retentate from each membrane constitutes the feed to the ensuing membrane. The permeate stream comprising diluent gas after the first stage membrane would typically be recycled to capture fluorochemicals desired for concentration, recertification and reutilization in the process of the present invention.

The elevated pressure contemplated for the separation of the present invention typically would be a pressure greater than 70 psig and more preferably pressures of 100–200 psig. The temperatures to which the process may be subjected to achieve the enhanced performance characteristics of increased permeate flux and increased selectivity between the permeate and the retentate would be temperatures above ambient, typically 100–200° F. and preferably approximately 150° F.

The process of the present invention will now be set forth in greater detail regarding a preferred embodiment with reference to FIG. 1. In FIG. 1, a fluorochemical containing exhaust gas from a semiconductor fabrication facility conducting an etch or clean process step is provided in stream 12 comprising a diluent gas, such as nitrogen, and fluorochemicals comprising potentially $NF_3$, $SF_6$, $CF_4$, $CHF_3$, $CH_3F$, $C_2F_6$, $C_2HF_5$, $C_3F_8$, $C_4F_8$, HF, $F_2$ and mixtures of these gases. Additional components in this mixture include; CO, $CO_2$, $H_2O$, $O_2$, $CH_4$, $SiF_4$, $SiH_4$, $COF_2$, $N_2O$, $NH_3$, $O_3$, Ar, $Br_2$, BrCl, $CCl_4$, $Cl_2$, $H_2$, HBr, HCl, He and $SiCl_4$. This gas mixture is typically removed via a vacuum pump 14 from the semiconductor fabrication facility. The gas stream potentially contains particulates which can be filtered out. Other components which are amenable to wet and dry scrubbing are removed in station 16, which typically removes soluble fluorides such as fluorine, hydrogen fluoride and carbonyl fluoride. The wet scrubbing would typically be by an aqueous scrubbing solution which removes the soluble fluorides.

The scrubbed gas stream is then commingled with a recycle stream 18 and sent to compressor 20 to be compressed to a pressure greater than 70 psig, and preferably in range of 100–200 psig. The gas stream at elevated pressure is then further heated in indirect heat exchanger 22 against any elevated temperature process stream, such as a process stream for the semiconductor manufacturing facility or a heater or export steam from any given process. The gas stream containing diluent gas and fluorochemicals is heated to a temperature above ambient, typically below 200° F. or any temperature below the decomposition of the membrane stages yet to be contacted and preferably 100–200° F., most preferably approximately 150° F.

The feed gas stream then contacts a first stage of a semi-permeable membrane 24 wherein the diluent gas, such as nitrogen, and a certain amount of fluorochemicals in low concentrations permeate with increased selectivity between the two, due to the elevated temperature, to become a permeate stream in line 26 which is acceptably vented or treated as an effluent from the process.

The retentate or stream which does not permeate the semi-permeable membrane in stage 24 is removed with an enriched content of the fluorochemicals. This stream is further heated to an elevated temperature in heat exchanger 28 comparable to the heating discussed in heat exchanger 22. The elevated pressure and elevated temperature gas stream which is the retentate from the first membrane in station 24 contacts an additional membrane stage in station 30 producing a second permeate stream comprising substantially diluent gas, such as nitrogen, and a minor amount of fluorochemicals, while also producing a second retentate, which does not permeate the membrane, as a stream rich in fluorochemicals that can be further processed through additional stages of membranes in a comparable context depending upon purities and the gas mixture being separated. The permeate stream from the second and all ensuing stages of the membrane station 30 is recycled as stream 18 upstream of the compression stage 20 in order to recapture fluorochemicals which may copermeate to a minor degree with the diluent gas. The elevated temperature operation of the membranes diminishes the concentration of these recycled fluorochemicals, due to the elevated temperature having the effect of increasing the permeate flux while increasing selectivity between the diluent gas and the fluorochemicals.

The fluorochemical-rich retentate exiting the last stage of the multi-stage membrane system 30 is then sent to an adsorption system 32 via line 31. The adsorption system 32 can contain one or more adsorption vessels 34, 35 which are used alternatively, e.g. one vessel is being regenerated while the other is adsorbing from the stream entering the system 32. The adsorption system 32 can be of the pressure-swing, vacuum-swing, or temperature-swing type using carbon, polymeric, or zeolitic adsorbents in one or more stages. Such systems are well known in the art and the adsorbent is selected to adsorb the fluorochemical components from the entry stream 31. The purified diluent from the adsorption system is vented during the adsorption steps through conduits 38, 40. Some of the vented purified diluent can be used to sweep the adsorbed fluorocarbon components after the adsorption step is completed, i.e. the adsorption vessel is being regenerated. The fluorocarbon-rich stream desorbed from the adsorption system enters conduit 42 as the product stream.

The product as stream 42 from the adsorption system may be recycled back to the semiconductor process or can be further enhanced or purified for reutilization by passage through an appropriate distillation station 44 thus producing a fluorochemical product 46 which typically could comprise selected purified fluorochemical gases and a by-product stream 36 which could contain other fluorochemical gases. The distillative post-treatment stage in station 44 can be directly connected with the adsorption purification system 32, alternatively, the fluorochemical gas stream resulting in line 42 could be packaged for transport to a central location removed or isolated from the membrane and adsorption separation for further purification repackaging and recertification for reuse by the semiconductor fabrication facility or facilities having similar demands.

Various downstream optional distillation processes can be contemplated, but a preferred distillation process would utilize a cryogenic fluid, e.g., liquid nitrogen, to operate the overhead condenser of a distillation column to provide reflux to the column, while heating by any traditional means could provide reboil to the column, wherein the column is operated initially to purify carbon tetrafluoride from inert gases, such as nitrogen, and subsequently the column is operated to remove hexafluoroethane from the sump of the distillation column to provide high purity gaseous hexafluoroethane product for repackaging and recycle.

Although the process has been described with regard to producing 99.9+% hexafluoroethane, it is also possible to reconfigure the process to produce carbon tetrafluoride, trifluoromethane, octafluoropropane, octafluorobutane, nitrogen trifluoride or sulfur hexafluoride, which are all widely used gases comprising fluorochemicals in etch and clean processes of the semiconductor fabrication industry. An important aspect of the present invention is the use of elevated temperatures in a membrane separation to separate inert diluent gases from fluorochemicals. Typically, elevated temperatures increase flux at the loss of selectivity. However, in the present invention, it has been found that not only does the flux of the permeate stream increase, but the selectivity between the diluent gas and the fluorochemical is increased given the elevated temperatures of the present invention and the membranes amenable to separating diluent inert gases, such as nitrogen, from fluorochemicals, such as hexafluoroethane.

Figure 2:
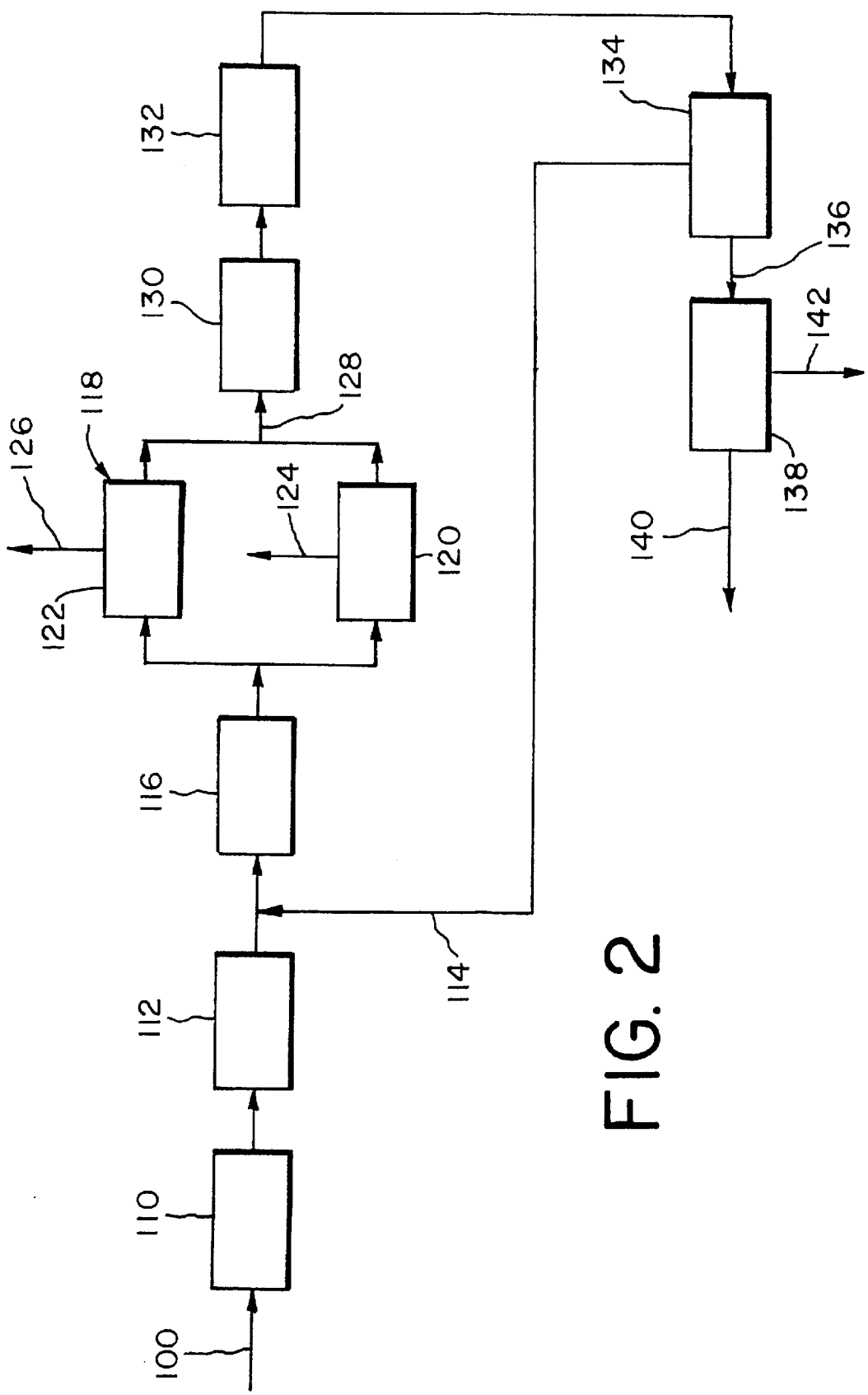
FIG. 2 is a schematic illustration of another embodiment of the present invention.

A second embodiment of the present invention is illustrated in FIG. 2 wherein a fluorochemical containing exhaust gas from a semiconductor fabrication facility conducting an etch or clean process step is provided in stream 100 comprising a diluent gas such nitrogen and a fluorochemical such as $NF_3$, $SF_6$, $CF_4$, $CHF_3$ and $C_2F_6$ and mixtures of these gases. Additional components such as described above may also be present in the mixture. The gas mixture is typically removed via a vacuum pump 110 from the semiconductor fabrication facility. The gas can contain particulates which can be filtered out. Other components which are amenable to wet and dry scrubbing are removed in station 112 which typically removes soluble fluorides such as fluorine, hydrogen fluoride and carbonyl fluoride. Wet scrubbing would typically use a scrubbing solution which removes the soluble fluorides.

The scrubbed gas stream from station 112 is then mixed with a recycle stream 114 and sent to a compressor 116 to be compressed to a pressure greater than 30 psia and preferably in the range of 45–735 psia. The gas stream at elevated pressure is then sent to an adsorption system 118 containing adsorption vessels 120 and 122. The adsorption system 118 can be of the pressure-swing, vacuum-swing or temperature- swing type utilizing carbon, polymeric, or zeolitic adsorbents and can be in one or more stages as shown for the purposes of illustration.

The adsorbent is selected to adsorb the fluorochemicals from the stream. The purified diluent in the adsorption system is vented during adsorption through conduits 124, 126. The desorbed fluorochemical enriched stream (depressurized to less than 30 psia, preferably 1.5 to 15 psia) in conduit 128 is then compressed in compressor 130 heated in heat exchanger 132 and sent to a membrane separation system 134 which can operate at ambient or elevated temperatures. In the case of operation at ambient temperature the heating step 132 can be eliminated. All permeate exiting the membrane separation system 134 is recycled to the exhaust for compression and delivery to the adsorption system in order to recover the fluorochemicals in these permeate streams. The membrane material may consist of polysulfone, polyethermide or ethyl cellulose polymer or any of the other suitable membrane materials commonly used in gas separations in hollow fiber, spiral wound, or flat sheet geometry as described above. The fluorochemical rich retentate exiting the last stage of the membrane in conduit 136 can be treated in a manner similar to the stream 42 in FIG. 1 or it can be further purified by distillation shown as step 138, if desired. The distillation step can be integral with the process or separate therefrom and result in a fluorochemical product 140 which could typically comprise selected purified fluorochemical gases and a by-product stream 142 which could contain other fluorochemical gases.

In either scheme shown in FIG. 1 or FIG. 2, the adsorption system dampens variations in inlet fluorochemical concentration, while increasing the fluorochemical concentration with little loss of the fluorochemical. The membrane alone can not dampen inlet variations in fluorochemical concentration unless the target outlet fluorochemical concentration from the membrane system is near 100 percent. However, attempting to reach near 100 percent fluorochemical concentration with a membrane system alone may result in too much loss of fluorochemicals to the vent.

Concentrating the fluorochemicals to a very high concentration with adsorption alone may be inefficient and costly, thus both schemes of the invention utilize membrane stages that can serve as efficient, cost-effective means of greatly enhancing the fluorochemical concentration with a minimum of pressure loss since the fluorochemicals remain in the high-pressure retentate stream.

In view of the fact that the stream exiting the adsorber during the adsorption cycle is essentially all diluent, the process of FIG. 2 has the further advantage of recovering all of the fluorochemicals, since all of the fluorochemicals in the permeate from the membrane stage(s) are recycled to the adsorber, For the user, factors such as equipment cost and relative cost of the membrane and adsorption systems, as well as the desired amount of the fluorochemical recovery, will determine which of the two processes should be chosen for a particular application.

Figure 3:
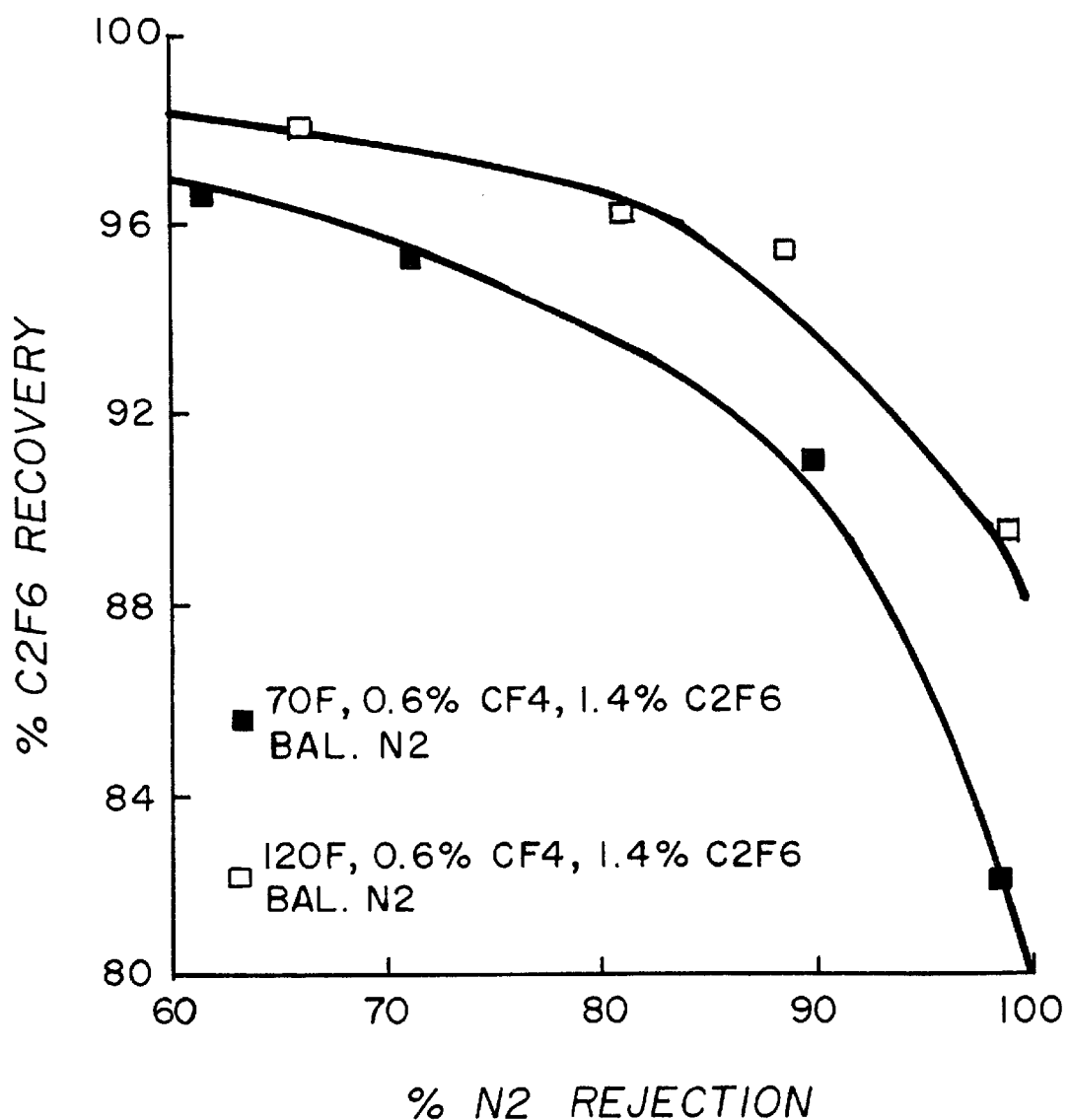
FIG. 3 is a graph of % $C_2F_6$ Recovery vs. % $N_2$ Rejection by volume of a gas stream containing 0.6% $CF_4$, 1.4% $C_2F_6$, and the balance $N_2$ at two different temperatures of 70° F. and 120° F. using a polysulfone membrane.

With regard to FIG. 3, a comparison of a stream of 0.6% carbon tetrafluoride, 1.4% hexafluoroethane and the balance nitrogen at 70° F. in comparison to a comparable stream at 120° F. is graphed in relation to the percent hexafluoroethane recovery ($C_2F_6$ in retentate/$C_2F_6$ in feed) against the percent of nitrogen rejection ($N_2$ in permeate/$N_2$ in feed). This is in the context of a polysulfone membrane. The recovery of hexafluoroethane for a given rejection of nitrogen by the membrane at increased temperature is uniformly superior to the recovery for the same rejection at lower temperatures. The enhanced flux rate is set forth in greater detail with regard to Table 1 below.

TABLE 1

| | Polysulfone | | | |
| --- | --- | --- | --- | --- |
| | P/L* 70°F. | $N_2/C_2F_6$ selectivity | P/L* 120°F. | $N_2/C_2F_6$ selectivity |
| $N_2$ | $3.2 \times 10^{-6}$ | 27 | $7.9 \times 10^{-6}$ | 53 |
| $C_2F_6$ | $1.2 \times 10^{-7}$ | | $1.5 \times 10^{-7}$ | |

*P/L is permeability divided by membrane thickness in units of scc/(cm² · sec · cm Hg)

Figure 4:
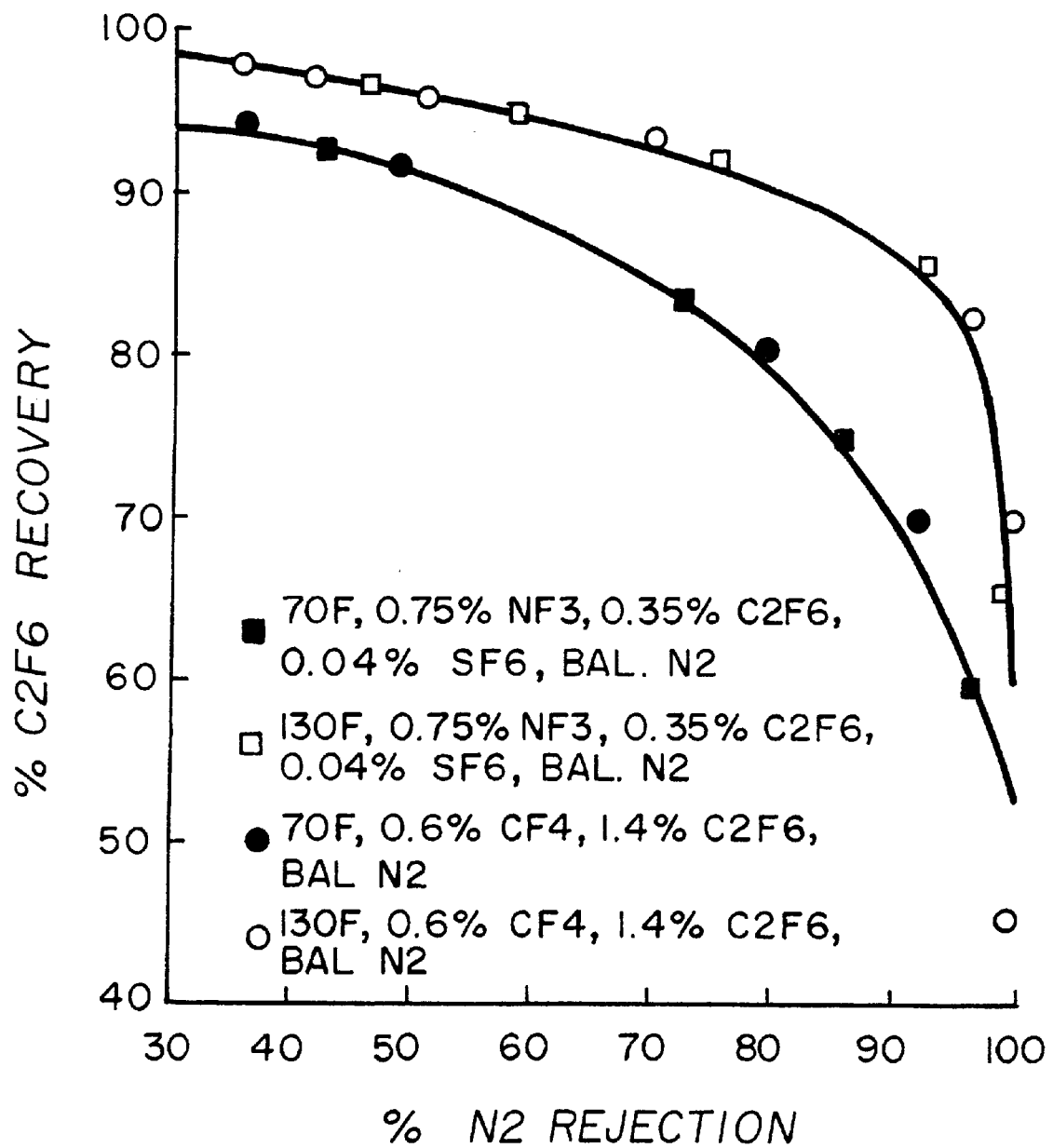
FIG. 4 is a graph of % $C_2F_6$ Recovery vs. % $N_2$ Rejection by volume of two gas streams, one having 0.75% $NF_3$, 0.35% $C_2F_6$, 0.04% $SF_6$ and the balance nitrogen, while the other has 0.6% $CF_4$, 1.4% $C_2F_6$, and the balance nitrogen, each at temperatures of 70° F. and 130° F. using an ethyl cellulose membrane.

The present invention has also been evaluated with regard to the unexpected property of elevated temperature membrane separation of fluorochemicals from inert gases by using an ethyl cellulose membrane as depicted in Fig.4. Again a graph of hexafluoroethane percent recovery versus percent nitrogen rejection is illustrated with regard to a stream comprising 0.75% nitrogen trifluoride, 0.35% hexafluoroethane, 0.04% sulfur hexafluoride and the balance of nitrogen at 70 and 130° F., as well as a stream containing 0.6% carbon tetrafluoride, 1.4% hexafluoroethane and the balance of nitrogen both at 70° F. and 130° F. In each instance the similar phenomena holds true, that the selectivity for the diluent gas increases with the flux rate for the diluent gas at the higher or more elevated temperature. The increased flux rate again is further illustrated by reference to Table 2 for ethyl cellulose membranes set forth below.

TABLE 2

| | Ethyl Cellulose | | | |
| --- | --- | --- | --- | --- |
| | P/L* 70° F. | $N_2/C_2F_6$ selectivity | P/L* 1300F | $N_2/C_2F_6$ selectivity |
| $N_2$ | $3.7 \times 10^{-5}$ | 7.6 | $7.5 \times 10^{-5}$ | 20 |
| $C_2F_6$ | $4.9 \times 10^{-6}$ | | $3.7 \times 10^{-6}$ | |

*P/L is permeability divided by membrane thickness in units of scc/(cm² · sec · cm Hg)

The capture, recovery, concentration and recycle of fluorochemicals, such as perfluorochemicals and more particularly perfluorocarbons has been a vexing problem for the semiconductor fabrication industry, which widely utilizes such fluorochemicals for etching and cleaning operations in the production of electronic devices and integrated circuits. Various attempts at providing economical, effective processes for abatement of fluorochemicals have been proffered by the prior art to avoid the venting or distribution of such fluorochemicals to the atmosphere, where they constitute a problem for their global warming potential. These prior art processes have typically been capital intensive requiring elaborate equipment and are energy intensive requiring significant compression and loss of compression in processing as well as circulating energy requirements dictated by physical adsorptive wash systems and multiple cryogenic distillation columns. The present invention overcomes these drawbacks to provide a viable process for fluorochemical capture, concentration, purification and potential recycle using relatively modest capital requirements. The unique utilization of elevated temperatures under the conditions of the present invention using appropriate membranes selective to the permeance of inert gases, such as nitrogen, and the concentration of the desired fluorochemicals, increases the flux of the permeate stream while enhancing selectivity of the diluent gas with respect to the fluorochemical to provide enhanced degrees of efficiency and economy in the processing of fluorochemicals by the present invention.

The present invention has been set forth with regard to several preferred embodiments, but the full scope of the invention should be ascertained by the claims which follow.

We claim:

1. A process for the separation and recovery of fluorochemicals from a gas stream containing a diluent gas and fluorochemicals by contact of the gas stream with a membrane, comprising the steps of:
    (a) compressing a gas stream containing a diluent gas and fluorochemicals to an elevated pressure;
    (b) heating the gas stream containing a diluent gas and fluorochemicals to an elevated temperature sufficient to increase the flux of the permeate stream of step (c) and to increase the selectivity of the membrane of step (c) for the permeation of the diluent gas of step (c) relative to the permeation of the fluorochemicals of step (c);
    (c) contacting the gas stream with a membrane which is selectively more permeable to the diluent gas than the fluorochemicals to result in a permeate stream rich in the diluent gas and a retentate rich in fluorochemicals;
    (d) contacting the retentate with one or more additional membranes which are selectively more permeable to the diluent gas than the fluorochemicals to result in a second permeate stream rich in the diluent gas and a second retentate rich in fluorochemicals;
    (e) recycling the second permeate stream to step (a) to be compressed with the gas stream containing diluent gas and fluorochemicals to an elevated pressure;
    (f) passing the second retentate rich in fluorochemicals to an adsorption system wherein enriched diluent is vented and a stream further enriched in fluorochemicals is adsorbed; and
    (g) desorbing said stream further enriched in fluorochemicals as a product stream.

2. The process of claim 1 wherein the gas stream containing a diluent gas and fluorochemicals is initially scrubbed to remove particulates, acid gases, and other water soluble components of the gas stream.

3. The process of claim 1 wherein after step (g) the product stream is further purified by distillation to provide a still further fluorochemical enriched product stream and a diluent rich vent stream.

4. The process of claim 3 wherein the fluorochemical enriched product stream comprises $C_2F_6$.

5. The process of claim 3 wherein the still further fluorochemical enriched product stream is recycled to a semiconductor fabrication process.

6. The process of claim 1 wherein the gas stream containing a diluent gas and fluorochemicals contains fluorochemicals selected from the group consisting of $NF_3$, $SF_6$, $CF_4$, $CHF_3$, $CH_3F$, $C_2F_6$, $C_2HF_5$, $C_3F_8$, $C_4F_8$ and mixtures thereof.

7. The process of claim 1 wherein the gas stream containing a diluent gas and fluorochemicals is an effluent gas stream from a semiconductor fabrication process.

8. The process of claim 7 wherein the product stream from the adsorption system is recycled to the semiconductor fabrication process.

9. The process of claim 1 wherein the membranes are selected from the group consisting of polysulfone, polyetherimide, polypropylene, cellulose acetate, polymethylpentane, amorphous copolymers based on 2,2-bistrifluoromethyl-4,5-difluoro-1,3-dioxole, polyvinyltrimethylsilane, polyimide, polyamide, polyaramide, ethyl cellulose and mixtures thereof.

10. The process of claim 1 wherein the adsorption system is one of pressure-swing, vacuum-swing or temperature-swing, utilizing one of carbon, polymeric, or zeolite adsorbents in one or more stages.

11. A process for the separation and recovery of fluorochemicals from a gas stream containing a diluent gas and fluorochemicals comprising the steps of:
    (a) compressing said gas stream containing diluent gas and fluorochemicals to an elevated pressure;
    (b) passing said gas stream containing diluent gas and fluorochemicals through an adsorption system to produce a vent stream rich in diluent gas and a fluorochemical enriched adsorbent;
    (c) desorbing a fluorochemical enriched stream from said adsorption system;
    (d) compressing said fluorochemical enriched stream;
    (e) heating said fluorochemical enriched stream of step (d) to an elevated temperature sufficient to increase the flux of a permeate stream of step (f) and to increase the selectivity of the membrane of step (f) for the permeation of the diluent gas of step (f) relative to the permeation of the fluorochemicals of step (f);
    (f) contacting the heated fluorochemical enriched gas stream with a membrane which is selectively more permeable to the diluent gas than the fluorochemicals to result in a permeate stream rich in the diluent gas and a retentate rich in fluorochemicals;
    (g) contacting the retentate with one or more additional membranes which are selectively more permeable to the diluent gas than the fluorochemicals to result in a second permeate stream rich in the diluent gas and a second retentate rich in fluorochemicals; and
    (h) recycling the second permeate stream to step (a) to be compressed with the gas stream containing diluent gas and fluorochemicals to an elevated pressure.

12. The process of claim 11 wherein the adsorption system is one of pressure-swing, vacuum-swing or temperature-swing, utilizing one of carbon, polymeric, or zeolite adsorbents in one or more stages.

13. The process according to claim 11 wherein a portion of the vent stream from the adsorption system is used to desorb the adsorption system.

14. The process of claim 11 wherein the gas stream containing a diluent gas and fluorochemical is initially scrubbed to remove particulates and water soluble components from the gas stream.

15. The process of claim 11 wherein the second retentate is further purified by distillation to provide a still further fluorochemical enriched product stream and a diluent rich stream.

16. The process of claim 15 wherein the still further fluorochemical enriched product stream is recycled to a semiconductor fabrication process.

17. The process of claim 11 wherein the gas stream containing a diluent gas and fluorochemicals contains fluorochemicals selected from the group consisting of $NF_3$, $SF_6$, $CF_4$, $CHF_3$, $CH_3F$, $C_2F_6$, $C_2HF_5$, $C_3F_8$, $C_4F_8$ and mixtures thereof.

18. The process of claim 11 wherein the gas stream containing a diluent gas and fluorochemicals is an effluent gas stream from a semiconductor fabrication process.

19. The process of claim 18 wherein the second retentate rich in fluorochemicals is recycled to the semiconductor fabrication process.

20. The process of claim 11 wherein the membranes are selected from the group consisting of polysulfone, polyetherimide, polypropylene, cellulose acetate, polymethylpentane, amorphous copolymers based on 2,2-bistrifluoromethyl-4,5-difluoro-1,3-dioxole, polyvinyltrimethylsilane, polyimide, polyamide, polyaramide, ethyl cellulose and mixtures thereof.

* * * * *